(12) United States Patent
Quanz et al.

(10) Patent No.: US 10,619,549 B2
(45) Date of Patent: Apr. 14, 2020

(54) LOBED EXHAUST MANIFOLD SLIP JOINT

(71) Applicant: CUMMINS INC., Columbus, IN (US)

(72) Inventors: Peter Thomas Quanz, Sherman, NY (US); Reid M. Irish, Stockton, NY (US)

(73) Assignee: Cummins Inc., Columbus, IN (US)

(*) Notice: Subject to any disclaimer, the term of this patent is extended or adjusted under 35 U.S.C. 154(b) by 81 days.

(21) Appl. No.: 15/752,538

(22) PCT Filed: Aug. 17, 2015

(86) PCT No.: PCT/US2015/045485
§ 371 (c)(1),
(2) Date: Feb. 13, 2018

(87) PCT Pub. No.: WO2017/030547
PCT Pub. Date: Feb. 23, 2017

(65) Prior Publication Data
US 2019/0003367 A1    Jan. 3, 2019

(51) Int. Cl.
*F01N 13/18* (2010.01)
*F16L 27/10* (2006.01)
(Continued)

(52) U.S. Cl.
CPC .......... *F01N 13/1811* (2013.01); *F01N 13/10* (2013.01); *F01N 13/1805* (2013.01);
(Continued)

(58) Field of Classification Search
CPC .. F01N 13/10; F01N 13/1805; F01N 13/1811; F01N 13/1844; F01N 2260/10;
(Continued)

(56) References Cited

U.S. PATENT DOCUMENTS

| 5,390,960 A | 2/1995 | Blake |
| 6,220,605 B1 | 4/2001 | Becker, Jr. |

(Continued)

FOREIGN PATENT DOCUMENTS

| CN | 102392602 A | 3/2012 |
| CN | 203022856 | 6/2013 |

(Continued)

OTHER PUBLICATIONS

International Search Report from corresponding PCT Application No. PCT/US2015/045485, dated Nov. 23, 2015, pp. 1-2.
(Continued)

*Primary Examiner* — Brandon D Lee
(74) *Attorney, Agent, or Firm* — Foley & Lardner LLP

(57) ABSTRACT

An apparatus comprises an engine, an exhaust manifold fluidly coupled thereto, and an auxiliary system positioned downstream of and fluidly coupled to the exhaust manifold. A slip joint assembly fluidly couples the exhaust manifold to the auxiliary system and includes a slip joint male portion fluidly coupled to the exhaust manifold which includes a plurality of lobes positioned on an outer surface of the male portion. The male portion defines a first passageway in fluidic communication with the exhaust manifold. The assembly also includes a slip joint female portion fluidly coupled to the auxiliary system and including a second passageway. The male portion is insertable into the female portion for fluidly coupling the male portion to the female portion. Only the plurality of lobes contact an inner surface of the second passageway. Moreover, the male portion is axially slidable within the second passageway while maintaining the fluid coupling therebetween.

23 Claims, 6 Drawing Sheets

(51) Int. Cl.
*F16L 27/12* (2006.01)
*F16L 37/04* (2006.01)
*F01N 13/10* (2010.01)

(52) U.S. Cl.
CPC ...... *F01N 13/1844* (2013.01); *F16L 27/1004* (2013.01); *F16L 27/1017* (2013.01); *F16L 27/12* (2013.01); *F16L 37/04* (2013.01); *F01N 2260/10* (2013.01); *F01N 2450/18* (2013.01)

(58) Field of Classification Search
CPC .............. F01N 2450/18; F16L 27/1004; F16L 27/1017; F16L 27/12; F16L 37/04
See application file for complete search history.

(56) References Cited

U.S. PATENT DOCUMENTS

| | | | |
|---|---|---|---|
| 6,481,086 B1* | 11/2002 | Davidson | F16L 25/14 |
| | | | 29/436 |
| 7,328,685 B2 | 2/2008 | Mockenhaupt et al. | |
| 7,837,233 B2 | 11/2010 | Johnston et al. | |
| 8,220,843 B2 | 7/2012 | More et al. | |
| 2006/0272321 A1 | 12/2006 | Mockenhaupt et al. | |
| 2009/0108543 A1* | 4/2009 | Hittle | F01N 13/10 |
| | | | 277/591 |
| 2011/0278835 A1 | 11/2011 | Kishi et al. | |
| 2012/0027158 A1 | 2/2012 | Watanabe et al. | |
| 2015/0226101 A1* | 8/2015 | Nishimura | F01N 3/103 |
| | | | 123/41.44 |

FOREIGN PATENT DOCUMENTS

| | | |
|---|---|---|
| CN | 103968173 A | 8/2014 |
| CN | 108019308 A | 5/2018 |
| JP | 2013-242259 | 12/2013 |
| WO | WO-2013/006132 | 1/2013 |

OTHER PUBLICATIONS

Written Opinion from corresponding PCT Application No. PCT/US2015/045485, dated Nov. 23, 2015, pp. 1-5.
Chinese Office Action from corresponding CN Application No. 2015800824216, dated Aug. 2, 2019, pp. 1-7.

* cited by examiner

LOBED EXHAUST MANIFOLD SLIP JOINT

CROSS-REFERENCE TO RELATED APPLICATIONS

This application claims the benefit of and priority to PCT Application No. PCT/US2015/045485, filed on Aug. 17, 2015, the content which are incorporated herein by reference in their entirety.

TECHNICAL FIELD

The present disclosure relates generally to coupling mechanisms for coupling engine exhaust manifolds with auxiliary systems.

BACKGROUND

Internal combustion (IC) engines such as gasoline engines, diesel engines, natural gas engines, and dual-fuel engines consume fossil fuels and produce an exhaust gas. The exhaust gas includes pollutants such as, for example NOx gases, particulate matter, carbon monoxide (CO), unburnt hydrocarbon among others. The exhaust gas expelled from the engine via an exhaust manifold is communicated to an aftertreatment system for removing pollutants from the exhaust gas so that the exhaust gas can meet emission requirements. In other implementations, at least a portion of the exhaust gas is also delivered to an auxiliary system, for example, an exhaust gas recirculation (EGR) system. The EGR system communicates the portion of the exhaust gas back to the engine (e.g., inserted into the engine cylinder) to reduce NOx emissions from the engine.

The joints where the exhaust manifold is fluidly coupled to the auxiliary systems are exposed to high thermal stress. Over several operation cycles, the surfaces of the joints in contact with each other can lock or freeze (e.g., due to oxidation, rusting or low temperature freezing, or interference fit due to thermal expansion), preventing or severely inhibiting the surfaces from sliding relative to each other during thermal expansion and contraction. This can cause the exhaust manifolds to crack, exhaust manifold gasket leaks and/or broken exhaust manifold bolts.

SUMMARY

Embodiments described herein relate generally to a slip joint assembly for fluidly coupling exhaust gas manifolds with auxiliary systems and in particular to a slip joint assembly that includes a slip joint male portion having a plurality of lobes defined on an outer surface of the slip joint male portion. The slip joint male portion is insertable into a slip joint female portion so that only the plurality of lobes contact an inner surface of the slip joint female portion.

In a first set of embodiments, an apparatus comprises an engine and an exhaust manifold fluidly coupled to the engine. An auxiliary system is positioned downstream of and fluidly coupled to the exhaust manifold. A slip joint assembly fluidly couples the exhaust manifold to the auxiliary system. The slip joint assembly includes a slip joint male portion fluidly coupled to the exhaust manifold. The slip joint male portion includes a plurality of lobes positioned on at least a portion of an outer surface of the slip joint male portion. The slip joint male portion defines a first passageway in fluidic communication with the exhaust manifold. The slip joint assembly also includes a slip joint female portion fluidly coupled to the auxiliary system. The slip joint female portion defines a second passageway in fluid communication with the auxiliary system. The slip joint male portion is insertable into the slip joint female portion, thereby fluidly coupling the slip joint male portion to the slip joint female portion such that only the plurality of lobes of the slip joint male portion contact an inner surface of the second passageway of the slip joint female portion. Moreover, the slip joint male portion is axially slidable within the second passageway while maintaining the fluid coupling therebetween.

In another set of embodiments, a slip joint assembly comprises a slip joint male portion defining a first passageway and a slip joint female portion defining a second passageway. The slip joint male portion includes a plurality of lobes positioned on at least a portion of an outer surface of the slip joint male portion. The slip joint male portion is insertable into the slip joint female portion, thereby fluidly coupling the slip joint male portion to the slip joint female portion such that only the plurality of lobes of the slip joint male portion contact an inner surface of the second passageway of the slip joint female portion. Moreover, the slip joint male portion is axially slidable within the second passageway while maintaining the fluid coupling therebetween.

In yet another set of embodiments, a method for coupling an exhaust manifold of an engine with an auxiliary system comprises providing a slip joint male portion on an outlet of the exhaust manifold. The slip joint male portion includes a plurality of lobes positioned on an outer surface of the slip joint male portion. The slip joint male portion defines a first passageway. A slip joint female portion is provided on an inlet of the auxiliary system, the slip joint female portion defines a second passageway. The slip joint male portion is inserted into the second passageway of the slip joint female portion so as to fluidly couple the slip joint male portion to the slip joint female portion. Only the plurality of lobes of the slip joint male portion contact an inner surface of the second passageway of the slip joint female portion. Moreover the slip joint male portion is axially slidable within the second passageway while maintaining the fluid coupling therebetween.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1A:
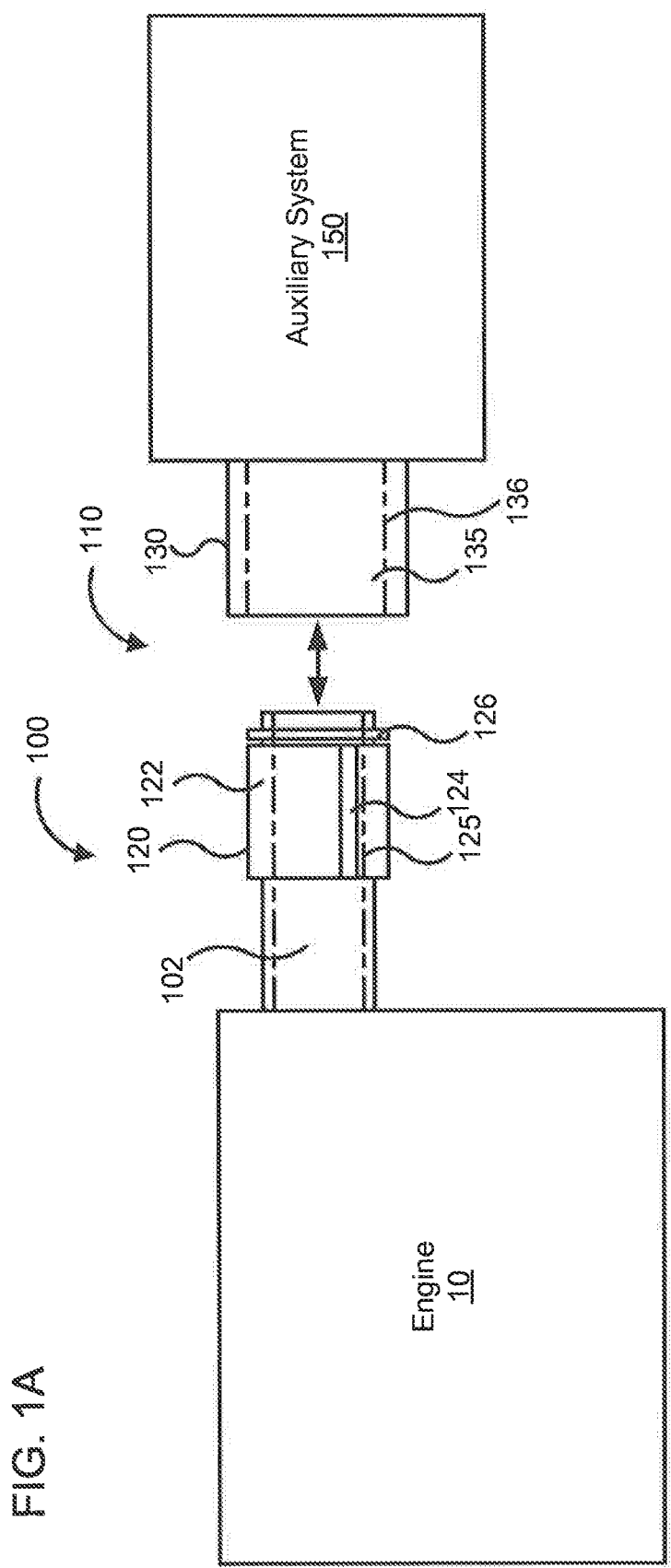
FIG. 1A is a schematic illustration of an apparatus that includes an engine including an engine exhaust manifold configured to be fluidly coupled to an auxiliary system via a slip joint assembly according to an embodiment.

Reference is made to the accompanying drawings throughout the following detailed description. In the drawings, similar symbols typically identify similar systems, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a slip joint assembly for fluidly coupling exhaust gas manifolds with auxiliary systems and in particular to a slip joint assembly that includes a slip joint male portion having a plurality of lobes defined on an outer surface of the slip joint male portion. The slip joint male portion is insertable into a slip joint female portion so that only the plurality of lobes contact an inner surface of the slip joint female portion.

Slip joints are mechanical connections sometimes found in tubular structures such as cylinders, piping, tubing or conduits to fluidly connect two portions of a pipe, for example an exhaust manifold with an inlet of an auxiliary system. Slip joints allow for motion between the portions of the pipe without the pipes getting disconnected from each other, for example telescopic pipes with adjustable lengths or to provide cushion for thermal expansion and/or contraction. Slip joints often include a first tube, cylinder, pipe or conduit having a slightly smaller diameter than a diameter of an inner passageway of a second tube, cylinder, pipe or conduit.

Such slip joints can often freeze, "lock up," get stuck or otherwise become immobile relative to each other, for example due to rusting, oxidation, thermal expansion, contraction, during low temperature environmental conditions, etc. Such actions create stress at the slip joint when a force is exerted on the slip joint urging the first tube to slide relative to the second tube (e.g., due to thermal expansion). The stress can eventually lead to mechanical damage. For example, in exhaust manifolds, freezing of slip joints can lead to cracked exhaust manifolds, exhaust manifold gasket leaks and broken exhaust manifold bolts.

Embodiments of the slip joint assemblies described herein provide benefits including, for example: (1) providing the ability to accommodate thermal expansion and contraction of the slip joint assembly, the exhaust manifold and/or the auxiliary system; (2) limiting contact between the slip joint portions, thereby reducing the contact area and thus the static frictional force between the slip joint portions; and (3) preventing leakage of exhaust gas from between the slip joint male portion and the slip joint female portion.

FIG. 1A is a schematic illustration of an apparatus 100 which includes an engine 10, an exhaust manifold 102, a slip joint assembly 110, and an auxiliary system 150. The engine 10 includes an IC engine which consumes fuel (e.g., gasoline, diesel or natural gas) and generates an exhaust gas.

The exhaust manifold 102 is fluidly coupled to the engine 10. The exhaust manifold 102 includes a tube, a pipe or any other conduit configured to receive the exhaust gas produced by the engine 10 and communicate the exhaust gas to the auxiliary system 150 via the slip joint assembly 110, as described herein. In one embodiment, the auxiliary system 150 includes an aftertreatment system for decomposing constituents of the exhaust gas. For example, the aftertreatment system can include an SCR system for decomposing NOx gases included in the exhaust gas, a particulate filter for filtering particulate matter, an oxidation catalyst (e.g., a diesel oxidation catalyst) to decompose carbon monoxide and unburnt hydrocarbons, an ammonia oxidation catalyst, and/or any other aftertreatment system.

In other embodiments, the auxiliary system 150 can include an EGR system. The EGR system is configured to receive at least a portion of the exhaust gas and recirculate at least the portion of the exhaust gas to the engine (e.g., insert at least the portion of the exhaust gas into a cylinder of the engine 10). This can lower the temperature of the combustion process in the IC engine, which reduces NOx emissions.

The slip joint assembly 110 fluidly couples the exhaust manifold 102 to the auxiliary system 150. The slip joint assembly 110 includes a slip joint male portion 120 and a slip joint female portion 130. The slip joint male portion 120 is fluidly coupled to the exhaust manifold 102. For example, the slip joint male portion 120 can be bolted, screwed, riveted or welded to the exhaust manifold 102. In one embodiment, an outlet of the exhaust manifold 102 forms the slip joint male portion 120. It should be appreciated that, while the slip joint assembly 110 is shown as coupling the exhaust manifold 102 to the auxiliary system 150, in various embodiments the slip joint assembly 110 can be used to couple various sections of an exhaust manifold 102. For example, the manifold 102 can include two sections coupled by the slip joint assembly 110, three sections coupled together via two slip joint assemblies or even more.

The slip joint male portion 120 defines a first passageway 125 in fluidic communication with the exhaust manifold 102. The slip joint male portion 120 is configured to be inserted in a second passageway 135 defined by the slip joint female portion 130. The slip joint male portion 120 can have any suitable cross-section, for example circular, square, rectangular, polygonal, asymmetric, etc. The cross-section of the slip joint male portion 120 can correspond to a cross-section of the second passageway 135 defined by the slip joint female portion 130 so that the slip joint male portion 120 can be easily inserted into the second passageway 135. The slip joint female portion 130 is fluidly coupled to the auxiliary system 150 so that fluidly coupling the slip joint male portion 120 to the slip joint female portion 130 fluidly couples the engine 10 to the auxiliary system via the slip joint assembly 110.

A plurality of lobes 124 are defined on at least a portion of an outer surface 122 of the slip joint male portion 120.

The plurality of lobes 124 can, for example be welded, fusion bonded, screwed, bolted, riveted or adhered to the outer surface 122 of the slip joint male portion 120. In other embodiments, the plurality of lobes 124 can be monolithically formed with the slip joint male portion 120. For example, the slip joint male portion 120 can be casted so that lobes are defined on the outer surface 122, or the outer surface can be turned or milled to remove a portion of the outer surface such that the remaining portion of the outer surface 122 defines the plurality of lobes 124.

The slip joint male portion 120 is insertable into the slip joint female portion 130 for fluidly coupling the slip joint male portion 120 to the slip joint female portion 130 such that only the plurality of lobes 124 of the slip joint male portion 120 contact an inner surface 136 of the second passageway 135. The slip joint male portion 120 is axially slidable within the second passageway 135 while maintaining the fluid coupling between the slip joint male portion 120 and the slip joint female portion 130.

Figure 1B:
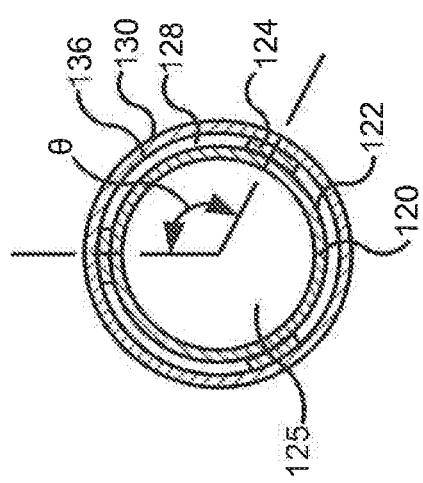
FIG. 1B shows a side cross-section of the slip joint assembly with a slip joint male portion inserted into a slip joint female portion.

Expanding further, FIG. 1B is a side cross-section of the slip joint assembly 110 with the slip joint male portion 120 inserted into the slip joint female portion 130. As described before, each of the plurality of lobes 124 includes axial lobes positioned axially on the outer 122 surface of the slip joint male portion 120. The plurality of axial lobes 124 are separated by a predetermined radial pitch θ on the outer surface 122 of the slip joint male portion 120. As used herein (for this and other embodiments described herein), "axial lobes" refers to lobes that extend axially along at least a portion of the longitudinal length outer surface 122 of the slip joint male portion 120 by a greater distance than the distance that the respective lobes extend radially along the outer surface 122 of the slip joint male portion 120.

As shown in FIG. 1B, three axial lobes 124 are positioned on the outer surface 122 of the slip joint male portion 120. In such implementations, the predetermined radial pitch θ can be 120 degrees. Furthermore, each of the plurality of lobes 124 is offset from the other lobes 124 such that there is no portion of a lobe 124 opposite another lobe 124. This may allow for more elastic deformation of the slip joint male portion 120 within the second passageway 135 of the slip joint female portion 130 under any interference load, for example, that may be applied at elevated temperature (e.g., load due to thermal expansion or contraction of the slip joint assembly 110 or the exhaust manifold 102). While FIG. 1B shows three outer lobes positioned on the outer surface 122, any other odd number of axial lobes 124 can be positioned on the outer surface (e.g., 5 lobes, 7 lobes or 9 lobes) such that the axial lobes are offset from each other. For example, five axial lobes can be positioned on the outer surface separated by a radial pitch of 72 degrees.

A sealing member 126 is also positioned on the outer surface 122 of the slip joint male portion 120 downstream of the plurality of lobes 124. The sealing member 126 can include a gasket or an O-ring (e.g., a rubber or polymer O-ring) positioned around the outer surface 122. In various embodiments, a slot, notch or groove is defined on the outer surface 122 downstream of the plurality of lobes 124 within which the sealing member 126 is seated. The sealing member 126 is inserted into the second passageway 135 when the slip joint male portion 120 is inserted into the second passageway 135 of the slip joint female portion 130. The sealing member 126 prevents the exhaust gas from escaping from between the slip joint male portion 120 and the slip joint female portion 130, thus minimizing or reducing exhaust gas leakage.

The cross-section (e.g., radius) of the slip joint male portion 120 at each lobe 124 can be in close tolerance with a cross-section (e.g., radius) of the second passageway 135 of the slip joint female portion 130. Thus, when the slip joint male portion 120 is inserted into the second passageway 135 of the slip joint female portion 130, the outer surface 122 of the slip joint male portion 120 can contact the inner surface 136 of the second passageway 135 only at the plurality of lobes 124. In other words, contact between the slip joint male portion 120 and the inner surface 136 of the second passageway 135 of the slip joint female portion 130 is limited to the plurality of lobes 124.

Limiting the contact between the slip joint male portion 120 and the slip joint female portion 130 to the plurality of lobes, and thereby increasing the clearance between the outer surface 122 of the slip joint male portion 120 and the inner surface 136 of the second passageway 135 results in lower static frictional force in the event of interference (i.e., contact) of the plurality of lobes 124 with the inner surface 136. The plurality of lobes 124 therefore, allow for locating the slip joint male portion 120 within the second passageway 135 of the slip joint female portion 130 while minimizing friction therebetween. The sealing member 126 positioned downstream of the plurality of lobes 124 contacts the inner surface 136 to provide the sealing preventing exhaust gas from escaping from between the inner surface 136 of the slip joint female portion 130 and the outer surface 122 of the slip joint male portion 120.

As described before, the slip joint male portion 120 is axially slidable within the slip joint female portion 130 in response to a thermal expansion or contraction of the slip joint male portion 120 or the slip joint female portion 130, and/or thermal expansion or contraction of the exhaust manifold 102 or the auxiliary system 150. During the expansion or contraction, only the plurality of axial lobes 124 contact the inner surface 136 of the second passageway of the slip joint female portion 130 during the axial sliding, as shown in FIG. 1B. This limits the friction between the outer surface 122 of the slip joint male portion 120 and inner surface 136 of the slip joint female portion 130, thereby reducing the probability of the slip joint assembly 110 freezing, as described before.

Figure 3B:
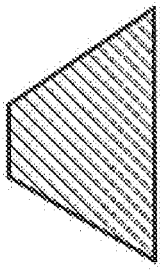
FIGS. 3A-F are various shapes of lobes that can be positioned on an outer surface of a slip joint male portion.
Figure 3C:
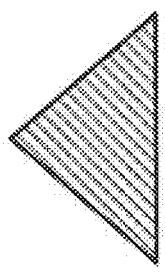
Figure 3E:
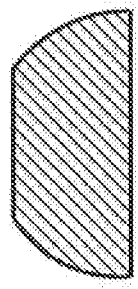
Figure 3F:
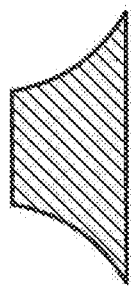
Figure 3A:
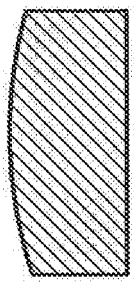
Figure 3D:
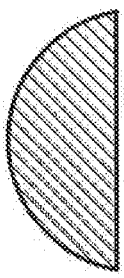

Each of the plurality of axial lobes 124 can have any suitable cross-section. For example, as shown in FIG. 1B each of the plurality of axial lobes 124 include vertical pillars having a domed surface which contacts the inner surface 136 of the slip joint female portion 130. In other embodiments, the plurality of axial lobes 124 can have any suitable cross-section. FIGS. 3B-3F show various non-limiting examples of cross-sections which can be defined by the plurality of axial lobes 124. The plurality of axial lobes 124 can have, for example a triangular cross-section (FIG. 3B), a trapezoidal cross-section (FIG. 3C), a semi-circular cross-section (FIG. 3D), a trapezoidal cross-section with chamfered sidewalls (FIG. 3E) or a truncated semi-circular cross-section (FIG. 3F).

Figure 2A:
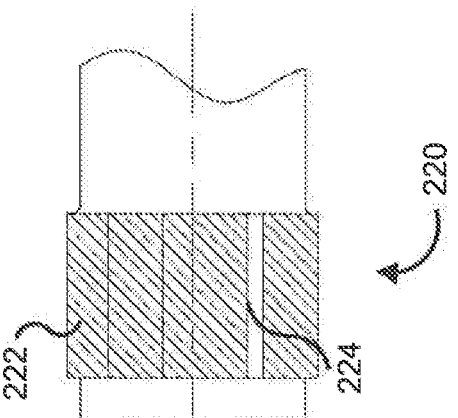
FIG. 2A is a left side view another embodiment of a slip joint male portion.
Figure 2B:
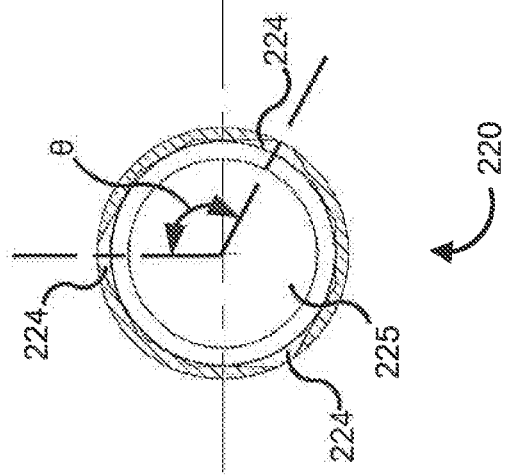
FIG. 2B is a front view thereof and FIG. 2C is a right side view thereof.
Figure 2C:
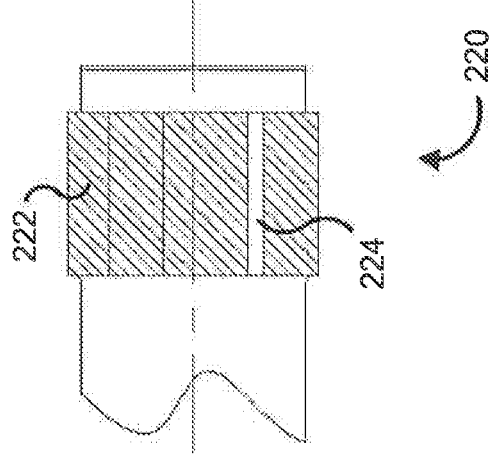

FIGS. 2A-C shows another embodiment of a slip joint male portion 220. The slip joint male portion 220 can be fluidly coupled to a fluidic passageway or channel, for example the exhaust manifold 102. The slip joint male portion 220 has an outer surface 222 and three axial lobes 224 positioned axially on the outer surface of the slip joint male portion 220. The axial lobes 224 are separated by a predetermined radial pitch θ. In a particular implementation, the predetermined radial pitch θ can be about 120 degrees so that each of the plurality of axial lobes 224 are offset from each other (i.e., not positioned opposite each other on the outer surface 222 of the slip joint male portion 220). This may allow for more elastic deformation of the slip joint male portion 220 within a second passageway of a slip joint female portion (e.g., the second passageway 135 of the slip joint female portion 130) under any interference load that may be applied at elevated temperature, as described before.

FIG. 2B shows a front view of the slip joint male portion 220. The slip joint male portion 220 defines a first passageway 225 for receiving a fluid (e.g., an exhaust gas from the engine 10 via the exhaust manifold 102). The slip joint male portion 220 is insertable into a second passageway defined by a slip joint female portion (e.g., the second passageway 135 of the slip joint female portion 130) which can be fluidly coupled to an auxiliary system (e.g., the auxiliary system 150). The inserting fluidly couples the first passageway 225 of the slip joint male portion 220 with the second passageway of the slip joint female portion to allow fluid to be communicated from the slip joint male portion 220 to the slip joint female portion and thereby, to the auxiliary system (e.g., the auxiliary system 150).

Each of the plurality of axial lobes 224 have a trapezoidal cross-section so that the peak of the trapezoid contacts the inner surface of the second passageway. The peak of the trapezoid can be filleted or rounded to provide smooth contact with an inner surface of the second passageway of the slip joint female portion (e.g., the inner surface 136 of the second passageway 135). The plurality of axial lobes 224 can be formed by milling or turning the outer surface 222 of the slip joint male portion 220. For example, the slip joint male portion 220 can initially have a circular cross-section. Portions of the outer surface highlighted by the cross-hatching on the outer surface 222 as shown in FIGS. 2A and 2C are then removed to define the plurality of axial lobes 224 on the outer surface 222.

Figure 4C:
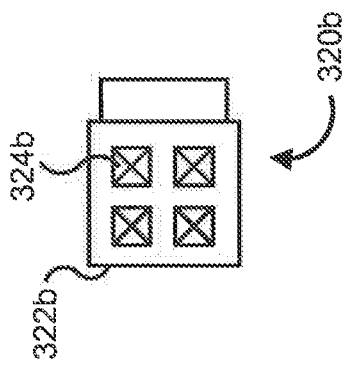
FIGS. 4A-C are various embodiments of slip joint male portions which include non-axial lobes positioned on outer surfaces of the slip joint male portions.
Figure 4B:
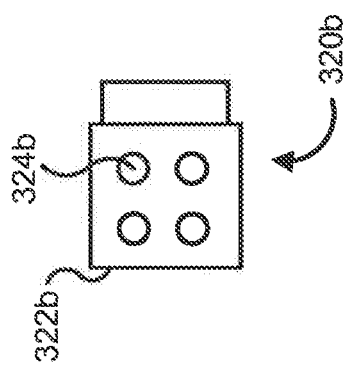
Figure 4A:
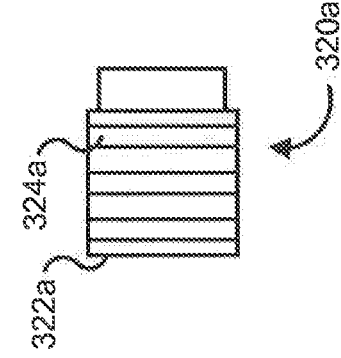

The slip joint male portion 120 and 220 include axial lobes. In other embodiments, a slip joint male portion can have non-axial lobes, i.e., the lobes do not extend axially along the longitudinal length of the outer surface of the slip joint male portion by a greater distance than the distance that the lobes extend radially along the outer surface. For example, FIG. 4A is a side view of an embodiment of a slip joint male portion 320a that includes a plurality of radial lobes 324a positioned on an outer surface 322a of the slip joint male portion 320a. FIG. 4B is a side view of another embodiment of a slip joint male portion 320b that includes an array of hemispherical lobes 324b positioned on an outer surface 322b of the slip joint male portion 320b. FIG. 4C is still another embodiment of a slip joint male portion 320c that includes an array of pyramidal lobes 324c position on an outer surface 322c of the slip joint male portion 320c.

Figure 5:
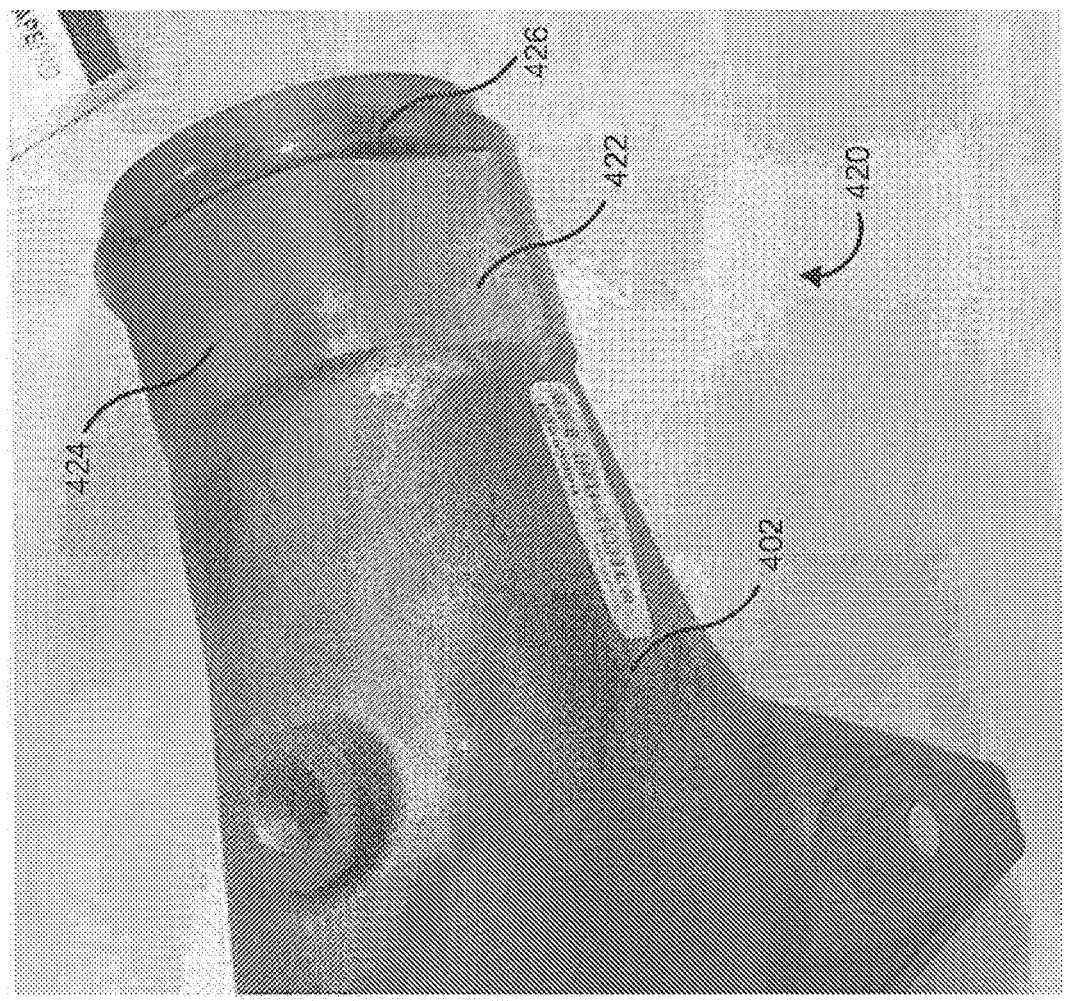
FIG. 5 is a perspective view of a portion of one embodiment of an exhaust manifold with a slip joint male portion configured to couple to a slip joint female portion of the exhaust manifold.

FIG. 5 is a perspective view of another embodiment of a slip joint male portion 420. The slip joint male portion 420 is fluidly coupled to an exhaust manifold 402. The exhaust manifold 402 can be fluidly coupled to an engine (e.g., the engine 10) to receive an exhaust gas from the engine. The slip joint male portion 420 includes a plurality of axial lobes 424 positioned on an outer surface 422 of the slip joint male portion 420. A sealing member 426 is positioned on the outer surface of the slip joint male portion 420 downstream of the plurality of axial lobes 424. The sealing member 426 is inserted into a passageway defined by a slip joint female portion (e.g., the second passageway 135 of the slip joint female portion 130) and seals the coupling between the slip joint male portion 420 and the slip joint female portion to prevent an exhaust gas flow from between the slip joint female portion and the slip joint male portion 420, while allowing the slip joint male portion 420 to axially slide relative to the slip joint female portion. In various embodiments, the slip joint female portion can be positioned in a second section of the exhaust manifold 402 such the insertion of the slip joint male portion 420 into the slip joint female portion assembles the exhaust manifold 402.

Figure 6:
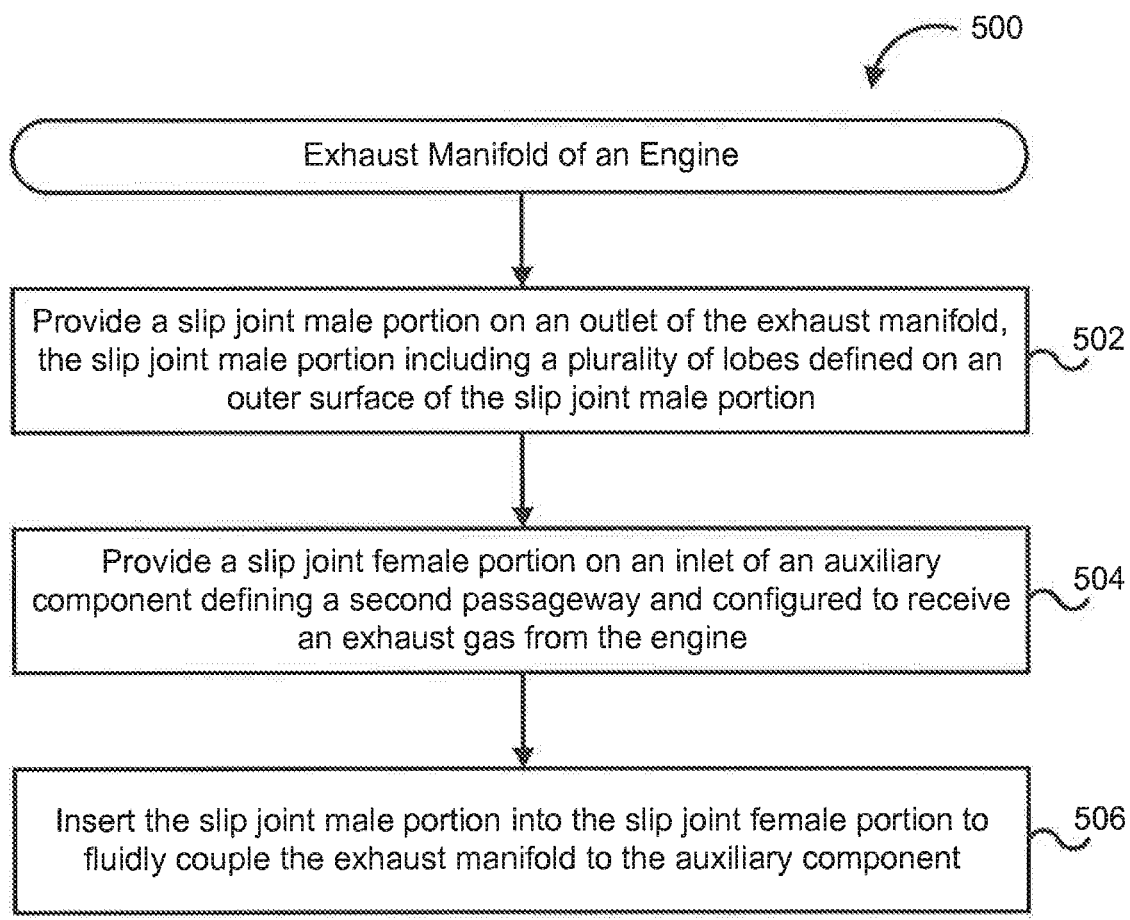
FIG. 6 is a schematic flow diagram of an example method for coupling an exhaust manifold of an engine with an auxiliary system using a slip joint assembly.

FIG. 6 is a schematic flow diagram of an example method 500 for coupling an exhaust manifold of an engine (e.g., the exhaust manifold 102 of the engine 10) with an auxiliary system (e.g. the auxiliary system 150) using a slip joint assembly (e.g., the slip joint assembly 110). The slip joint assembly includes a slip joint male portion (e.g., the slip joint male portion 120, 220 320a-c or 420) and a slip joint female portion (e.g., the slip joint female portion 130).

The method 500 includes providing a slip joint male portion on an outlet of the exhaust manifold at 502. The slip joint male portion includes a plurality of lobes positioned on an outer surface of the slip joint male portion and defines a first passageway. For example, the slip joint male portion 120 which includes the plurality of lobes 124 positioned on the outer surface 122 of the slip joint male portion is provided on the outlet of the exhaust manifold 102. The providing can include fluidly coupling (e.g., riveting, bolting, screwing or welding) the slip joint male portion 120 to the outlet of the exhaust manifold 102 or forming the slip joint male portion 120 monolithically with the exhaust manifold (e.g., during via a casting turning or milling process).

Each of the plurality of lobes can include axial lobes (e.g., the axial lobes 124 or 224) positioned axially on the outer surface of the slip joint male portion. In particular embodiments, three axial lobes are positioned on the outer surface of the slip joint male portion which are separated by a predetermined radial pitch, for example a radial pitch of 120 degrees as described with respect to the slip joint male portion 120. In various embodiments, the plurality of lobes (e.g., the plurality of lobes 124) can define a trapezoidal cross-section. In other embodiments, the plurality of axial lobes can define any other suitable cross-section, for example as described with respect to FIGS. 2A-C and FIGS. 3A-F. In still other embodiments, the plurality of lobes can include non-axial lobes, for example as described with respect to FIGS. 4A-C.

A slip joint female portion is provided on an inlet of the auxiliary system at 504. The slip joint female portion defines a second passageway. For example, the slip joint female portion 130 is provided on the inlet of the auxiliary system 150. The providing can include fluidly coupling (e.g., riveting, bolting, screwing or welding) the slip joint female portion 130 to the inlet of the auxiliary system 150 or monolithically forming the slip joint female portion 130 with the inlet of the auxiliary system 150 (e.g., an aftertreatment system or an EGR system).

The slip joint male portion is inserted into the slip joint female portion so as to fluidly couple the slip joint male portion to the slip joint female portion at 506. Only the plurality of lobes of the slip joint male portion contact an inner surface of the second passageway of slip joint female portion. Furthermore, the slip joint male portion is axially slidable within the second passageway while maintaining the fluid coupling therebetween.

For example, the slip joint male portion 120 is inserted into the slip joint female portion 130 of the slip joint assembly 110 to fluidly coupled the slip joint male portion 120 to the slip joint female portion 130 so that only the plurality of axial lobes 124 of the slip joint male portion 120 contact the inner surface 136 of the second passageway 135 of the slip joint female portion 130. Furthermore, the slip joint male portion 120 is axially slidable within the second passageway 135 of the slip joint female portion 130.

The slip joint male portion (e.g., the slip joint male portion 120) is axially slidable within the slip joint female portion (e.g., the slip joint female portion 130) responsive to a thermal expansion or contraction of the slip joint male portion and/or the slip joint female portion. Only the plurality of lobes (e.g., the plurality of axial lobes 124) contact the inner surface of the slip joint female portion (e.g., the inner surface 136 of the slip joint female portion 130) during the axial sliding which limits the friction between the outer surface of the slip joint male portion and the inner surface of the slip joint female portion. This can limit or prevent freezing of the slip joint male portion within the second passageway of the slip joint female portion, as described before.

A sealing member (e.g., the sealing member 126 or 426) can be positioned on the outer surface of the slip joint male portion (e.g., the outer surface 122 of the slip joint male portion 120) downstream of the plurality of lobes (e.g., the plurality of lobes 124). The inserting of the slip joint male portion into the second passageway of the slip joint female portion also inserts the sealing member into the second passageway. The sealing member prevents the exhaust gas from escaping from between the slip joint male portion and the slip joint female portion as described before.

It should be noted that the term "example" is used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus for an engine, comprising:
    an exhaust manifold configured to be fluidly coupled to the engine
    an auxiliary system positioned downstream of and fluidly coupled to the exhaust manifold, the auxiliary system configured to treat an exhaust gas received from the engine or recirculate at least a portion of the exhaust gas back to the engine; and
    a slip joint assembly fluidly coupling the exhaust manifold to the auxiliary system, the slip joint assembly comprising:
        a slip joint male portion fluidly coupled to the exhaust manifold, the slip joint male portion including a plurality of axial lobes extending axially from an outer surface of the slip joint male portion, the plurality of axial lobes being axially aligned and radially offset from each other such that a radial gap exists between each of the plurality of axial lobes, the slip joint male portion defining a first passageway in fluidic communication with the exhaust manifold,
        a slip joint female portion fluidly coupled to the auxiliary system, the slip joint female portion defining a second passageway in fluid communication with the auxiliary system,
        wherein the slip joint male portion is inserted into the slip joint female portion, thereby fluidly coupling the slip joint male portion to the slip joint female portion such that only the plurality of axial lobes of the slip joint male portion contact an inner surface of the second passageway of the slip joint female portion, the slip joint male portion axially slidable within the second passageway while maintaining the fluid coupling therebetween.

2. The apparatus of claim 1, wherein the slip joint assembly further includes:
    a sealing member positioned downstream of the plurality of axial lobes on the outer surface of the slip joint male portion.

3. The apparatus of claim 1, wherein the slip joint male portion is axially slidable within the slip joint female portion responsive to a thermal expansion or contraction of at least one of the slip joint male portion and the slip joint female portion, only the plurality of axial lobes contacting the inner surface of the slip joint female portion during the axial sliding, thereby limiting friction between the outer surface of the slip joint male portion and the inner surface of the slip joint female portion.

4. The apparatus of claim 1, wherein at least three axial lobes are positioned on the outer surface of the slip joint male portion, the at least three axial lobes separated by a predetermined radial pitch.

5. The apparatus of claim 4, wherein the predetermined radial pitch is 120 degrees.

6. The apparatus of claim 1, wherein five axial lobes are positioned on the outer surface of the slip joint male portion.

7. The apparatus of claim 1, wherein each of the plurality of the axial lobes define a trapezoidal cross-section.

8. The apparatus of claim 1, wherein the auxiliary system includes an aftertreatment system configured to decompose constituents of the exhaust gas.

9. The apparatus of claim 1, wherein the auxiliary system includes an exhaust gas recirculation system.

10. A slip joint assembly for coupling an exhaust manifold of an engine with an auxiliary system that is configured to treat an exhaust gas received from the engine or recirculate at least a portion of the exhaust gas back to the engine, comprising:
    a slip joint male portion including a plurality of axial lobes extending from an outer surface of the slip joint male portion, the plurality of axial lobes being axially aligned and radially offset from each other such that a radial gap exists between each of the plurality of axial lobes, the slip joint male portion defining a first passageway; and
    a slip joint female portion defining a second passageway, wherein the slip joint male portion is inserted into the slip joint female portion, thereby fluidly coupling the slip joint male portion to the slip joint female portion such that only the plurality of axial lobes of the slip joint male portion contact an inner surface of the second passageway of the slip joint female portion, the slip joint male portion axially slidable within the second passageway while maintaining the fluid coupling therebetween.

11. The slip joint assembly of claim 10, wherein slip joint further includes:
    a sealing member positioned downstream of the plurality of axial lobes on an outer surface of the slip joint male portion.

12. The slip joint assembly of claim 10, wherein the slip joint male portion is axially slidable within the slip joint female portion responsive to a thermal expansion or contraction of at least one of the slip joint male portion and the slip joint female portion, only the plurality of axial lobes contacting the inner surface of the slip joint female portion during the axial sliding, thereby limiting friction between the outer surface of the slip joint male portion and the inner surface of the slip joint female portion.

13. The slip joint assembly of claim 10, wherein at least three axial lobes are positioned on the outer surface of the slip joint male portion, the at least three axial lobes separated by a predetermined radial pitch.

14. The slip joint assembly of claim 13, wherein the predetermined radial pitch is 120 degrees.

15. The slip joint assembly of claim 14, wherein each of the plurality of the axial lobes define a trapezoidal cross-section.

16. A method for coupling an exhaust manifold of an engine with an auxiliary system that is configured to treat an exhaust gas received from the engine or recirculate at least a portion of the exhaust gas back to the engine, the method comprising:
    providing a slip joint male portion on an outlet of the exhaust manifold, the slip joint male portion including a plurality of axial lobes extending from an outer surface of the slip joint male portion, the plurality of axial lobes being axially aligned and radially offset from each other such that a radial gap exists between each of the plurality of axial lobes, the slip joint male portion defining a first passageway;
    providing a slip joint female portion on an inlet of an auxiliary system, the slip joint female portion defining a second passageway;
    inserting the slip joint male portion into the second passageway of the slip joint female portion so as to fluidly couple the slip joint male portion to the slip joint female portion, only the plurality of axial lobes of the slip joint male portion contacting an inner surface of the second passageway of the slip joint female portion, the slip joint male portion axially slidable within the second passageway while maintaining the fluid coupling therebetween.

17. The method of claim 16, wherein a sealing member is positioned on the outer surface of the slip joint male portion downstream of the plurality of axial lobes, and wherein the inserting also inserts the sealing member into the second passageway, the sealing member preventing the exhaust gas from escaping from between the slip joint male portion and the slip joint female portion.

18. The method of claim 16, wherein the slip joint male portion is axially slidable within the slip joint female portion responsive to a thermal expansion or contraction of at least one of the slip joint male portion and the slip joint female portion, only the plurality of axial lobes contacting the inner surface of the slip joint female portion during the axial sliding, thereby limiting friction between the outer surface of the slip joint male portion and the inner surface of the slip joint female portion.

19. The method of claim 16, wherein at least three axial lobes are positioned on the outer surface of the slip joint male portion, the at least three axial lobes separated by a predetermined radial pitch.

20. The method of claim 19, wherein the predetermined radial pitch is 120 degrees.

21. The method of claim 16, wherein each of the plurality of the axial lobes define a trapezoidal cross-section.

22. The method of claim 16, wherein the auxiliary system includes an aftertreatment system configured to decompose constituents of the exhaust gas.

23. The method of claim 16, wherein the auxiliary system includes an exhaust gas recirculation system.

* * * * *